(12) United States Patent
Richards

(10) Patent No.: US 9,080,630 B2
(45) Date of Patent: Jul. 14, 2015

(54) SNUBBER WITH SECONDARY FLUID RESERVOIR

(75) Inventor: Richard E. Richards, Hartville, MO (US)

(73) Assignee: Mueller International, LLC, Atlanta, GA (US)

( * ) Notice: Subject to any disclaimer, the term of this patent is extended or adjusted under 35 U.S.C. 154(b) by 316 days.

(21) Appl. No.: 12/793,840

(22) Filed: Jun. 4, 2010

(65) Prior Publication Data

US 2011/0056784 A1   Mar. 10, 2011

Related U.S. Application Data

(60) Provisional application No. 61/184,518, filed on Jun. 5, 2009.

(51) Int. Cl.
```
F16F 9/34    (2006.01)
F16F 9/19    (2006.01)
F16F 9/20    (2006.01)
F16F 9/49    (2006.01)
F16F 9/18    (2006.01)
```

(52) U.S. Cl.
CPC . *F16F 9/20* (2013.01); *F16F 9/182* (2013.01); *F16F 9/34* (2013.01); *F16F 9/49* (2013.01)

(58) Field of Classification Search
CPC .......... F16F 9/06; F16F 9/10; F16F 9/34; F16F 9/44; F16F 9/46; F16F 9/325; F16F 9/364; F16F 9/512; F16F 9/3214; F16F 9/3405

USPC ........... 188/322.15, 322.13, 282.7, 314, 316, 188/266; 267/118

See application file for complete search history.

(56) References Cited

U.S. PATENT DOCUMENTS 2,009,091 A * 7/1935 Martin et al. ............... 188/320
2,523,631 A * 9/1950 Paxton ..................... 188/282.7

(Continued)

FOREIGN PATENT DOCUMENTS

GB         2150259       6/1985
JP         10325439 A  * 12/1998 ................ F16F 9/50

OTHER PUBLICATIONS

Richards; International Search Report and Written Opinion for serial No. PCT/US10/037367, filed Jun. 4, 2010, mailed Nov. 8, 2010, 23 pgs.

(Continued)

*Primary Examiner* — Anna Momper
*Assistant Examiner* — San Aung
(74) *Attorney, Agent, or Firm* — Taylor English Duma LLP

(57) ABSTRACT

Methods and systems for preventing vacuums within a snubber during a predetermined condition are disclosed. The snubber includes a body at least partially filled with fluid, a piston capable of sliding within the fluid in the body, a lockup valve that allows the piston to move freely under operating conditions and limits the motion of the piston under a predetermined set of conditions, and a reservoir positioned within the piston rod containing a reserve of fluid.

22 Claims, 6 Drawing Sheets

(56) References Cited

U.S. PATENT DOCUMENTS

| | | | | |
|---|---|---|---|---|
| 4,228,741 A | * | 10/1980 | Bruner | 105/198.3 |
| 4,241,816 A | | 12/1980 | Hubrecht et al. | |
| 4,480,555 A | * | 11/1984 | Shafer et al. | 105/199.1 |
| 4,850,461 A | * | 7/1989 | Rubel | 188/282.1 |
| 5,462,141 A | | 10/1995 | Taylor | |
| 5,913,391 A | * | 6/1999 | Jeffries et al. | 188/317 |
| 5,934,423 A | * | 8/1999 | Kallenbach | 188/374 |
| 6,352,145 B1 | * | 3/2002 | DeMolina et al. | 188/281 |
| 7,565,956 B2 | * | 7/2009 | Lee et al. | 188/282.7 |
| 2006/0207843 A1 | * | 9/2006 | Migli | 188/282.1 |

OTHER PUBLICATIONS

Richards; PCT Application entitled: Snubber with Secondary Fluid Reservoir having serial No. PCT/US10/37367, filed Jun. 4, 2010, 18 pgs.

Richards, Richard; U.S. Provisional Application entitled: Snubber with Secondary Fluid Reservoir, having serial No. 61/184,518, filed Jun. 5, 2009, 17 pgs.

Richards; International Preliminary Report on Patentability for serial No. PCT/US10/037367, filed Jun. 4, 2010, mailed Dec. 6, 2011, 5 pgs.

* cited by examiner

SNUBBER WITH SECONDARY FLUID RESERVOIR

REFERENCE TO RELATED APPLICATIONS

This application claims priority to U.S. provisional application Ser. No. 61/184,518 filed Jun. 5, 2009, entitled "Snubber With Secondary Fluid Reservoir," which is hereby specifically and entirely incorporated by reference.

BACKGROUND

1. Field of the Invention

The invention is directed to snubbers (also known as shock arrestors) and methods of controlling the motion of objects with snubbers. In particular, the invention is directed toward hydraulic snubbers and methods of controlling the motion of objects with hydraulic snubbers.

2. Background of the Invention

Hydraulic snubbers or shock arrestors are often used in piping systems to allow slow movement of the pipes due to thermal expansion while protecting the piping systems and equipment from accidental damage arising from abnormal loading or movement conditions due to a shock force or vibration such as experienced during a seismic disturbance. Snubbers are often used in power plants to restrain pipes during seismic conditions since using fixed coupling could cause damage to the pipes during normal events.

FIG. 1 shows a basic schematic of a prior art snubber 100. Snubber 100 would be coupled at one end to a fixed object, such as a power plant wall or floor, while the other end would be coupled to a pipe. A basic hydraulic snubber consists of a cylinder (which includes a body, piston and piston rod or rods), a control valve, and a hydraulic fluid reservoir. Under normal circumstances, such as when the pipe is heating up, piston rod 105 would push piston 110 into body 115. Body 115 is filled with a slightly compressible fluid. As piston 110 extends into body 115, the fluid inside chamber 125 passes through control valve 130 and is displaced into chamber 120. The excess fluid (since the snubber only has one piston rod) is displaced into reservoir 135. On the other hand, as the pipe cools, piston rod 105 exits body 115 causing piston 110 to move within body 115. In that circumstance, chamber 125 will fill as chamber 120 empties. Since chamber 125 has a larger area than chamber 120 more fluid is required to fill chamber 125 than is supplied by chamber 120. This fluid comes from reservoir 135. Under operating circumstances, snubber 100 will function almost invisibly.

Under predetermined conditions, for instance during seismic events, the snubber must be able to lock up to prevent damage to the system. During such conditions, piston 110 may move quickly closing control valve 130. In this case fluid is supplied from reservoir 135. However, as can be seen in FIG. 2, valve 230 and reservoir 235 greatly increases the size of snubber 200, thereby making the space needed to install snubber 200 greater. To minimize the size of the snubber a double ended cylinder (a piston rod on each end of the piston) is utilized with the control valves installed in the piston. An internal reservoir is utilized for fluid expansion and contraction. Unlike a single ended cylinder (one piston rod), fluid is not required to enter or exit the reservoir during normal stroking. During the normal (valves unlocked) mode fluid simply transfers from one side of the piston to the other thru the normally open lockup valves. During modes where one of the valves is closed the fluid on one side of the cylinder is compressed and the other side needs fluid to compensate for the resultant fluid compression. Since the valves are in the piston and not directly connected to the reservoir, the reservoir cannot supply the required fluid. If additional fluid is not provided to fill the vacuum, the vacuum will initially remove any entrained or entrapped air contained in the fluid, creating bubbles. If a sufficient vacuum level is attained, the fluid may vaporize causing even more bubbles. Bubbles will result in a lower spring rate and possible erratic lock-up rates, in order to minimize these effects, some manufacturers of snubbers degas the fluid before inserting it into the snubber, however this is a very costly operation. Thus it is desirable to have a snubber without external valves and fluid reservoirs and without the need to de-gas the fluid.

SUMMARY OF THE INVENTION

The present invention overcomes the problems and disadvantages associated with current strategies and designs and provides new tools and methods of controlling movement of an object.

One embodiment of the invention is directed to a snubber that includes a body that is at least partially filled with fluid. The snubber has a piston that slides within the fluid in the body. The snubber also includes a lockup valve that allows the piston to move freely under operating conditions and limits the motion of the piston under a predetermined set of conditions, a reservoir for thermal expansion and contraction of the fluid, and a second reservoir positioned within the piston rod containing a reserve of fluid.

In certain embodiments, the lockup valve divides at least a portion of the body into two chambers. In certain embodiments, the lockup valve is coupled to the piston and is comprised of at least two valves in fluid communication with each other via a conduit. One valve is in fluid communication with one chamber and a second valve is in fluid communication with the second chamber.

In certain embodiments, as the piston moves within the body, fluid displaced by the piston is transferred from one chamber to the other chamber via the lockup valve.

In certain embodiments, the main reservoir supplies fluid during the operating conditions and the secondary reservoir supplies fluid during the predetermined set of conditions. In certain embodiments, the fluid has viscosity stability of between 40 mRad and 200 mRad. In certain embodiments, the snubber is able to bear a load of between 50 klb and 120 klb.

In certain embodiments, the snubber includes a spring within the body to keep the fluid in the main reservoir under pressure. In certain embodiments, the snubber includes a second spring coupled to the secondary reservoir to keep the fluid in the reservoir under pressure.

Another embodiment is directed to a method for controlling the motion of an object. The method includes the steps of allowing the object to move freely during operating conditions, limiting the movement of the object with a snubber during a predetermined set of conditions, and preventing vacuums in the snubber during the predetermined set of conditions with fluid held in a reservoir inside a piston rod of the snubber.

In certain embodiments, the object is a pipe. In certain embodiments, the movement is limited during the predetermined set of conditions by a lockup valve coupled to the piston. In certain embodiments, the lockup valve is open during operation conditions and locks up during the predetermined set of conditions. The predetermined set of conditions may be a seismic event.

In certain embodiments, the fluid is maintained within the snubber during operating conditions with fluid held in a reservoir outside the piston. A spring may apply pressure to the fluid within the snubber.

Other embodiments and advantages of the invention are set forth in part in the description, which follows, and in part, may be obvious from this description, or may be learned from the practice of the invention.

DESCRIPTION OF THE DRAWINGS

The invention is described in greater detail by way of example only and with reference to the attached drawings, in which.

DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

A problem in the art capable of being solved by the embodiments of the present invention is a snubber device having a narrow body design with an extra fluid reservoir. It has been surprisingly discovered that including a fluid reservoir inside the piston rod of a snubber reduces the overall size of the snubber while still providing a reservoir for extra fluid, to compensate for fluid which is compressed.

Figure 1:
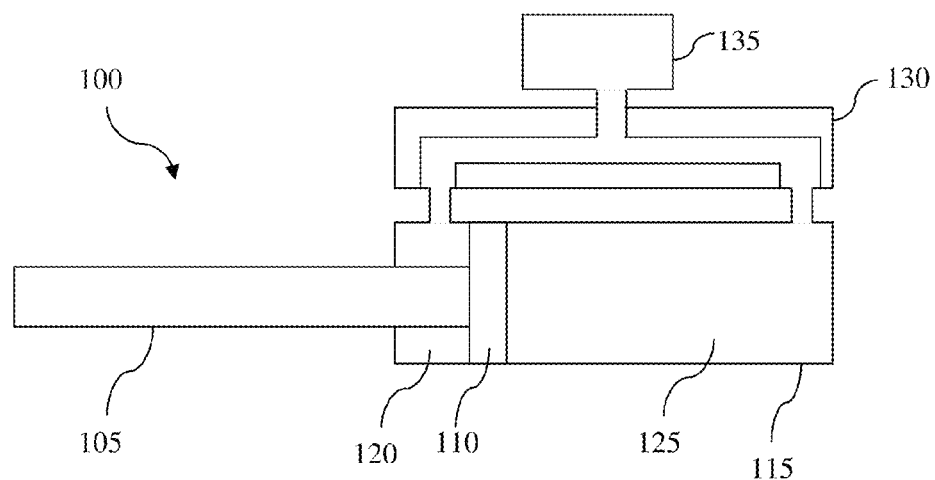
FIG. 1 is a basic schematic of the prior art.
Figure 2:
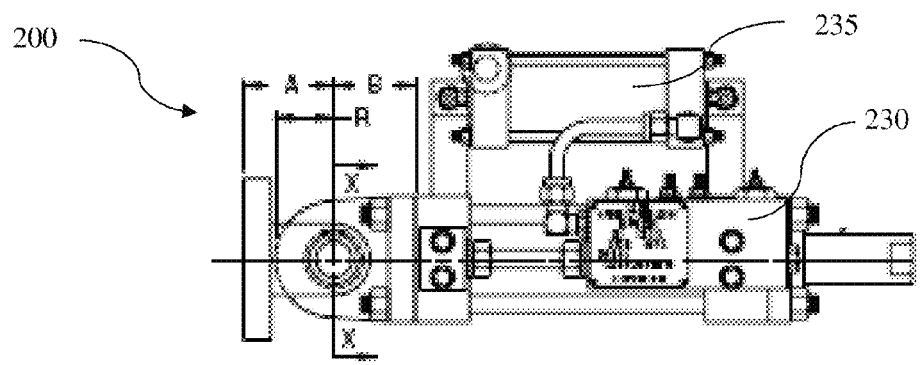
FIG. 2 is a prior art snubber.
Figure 3:
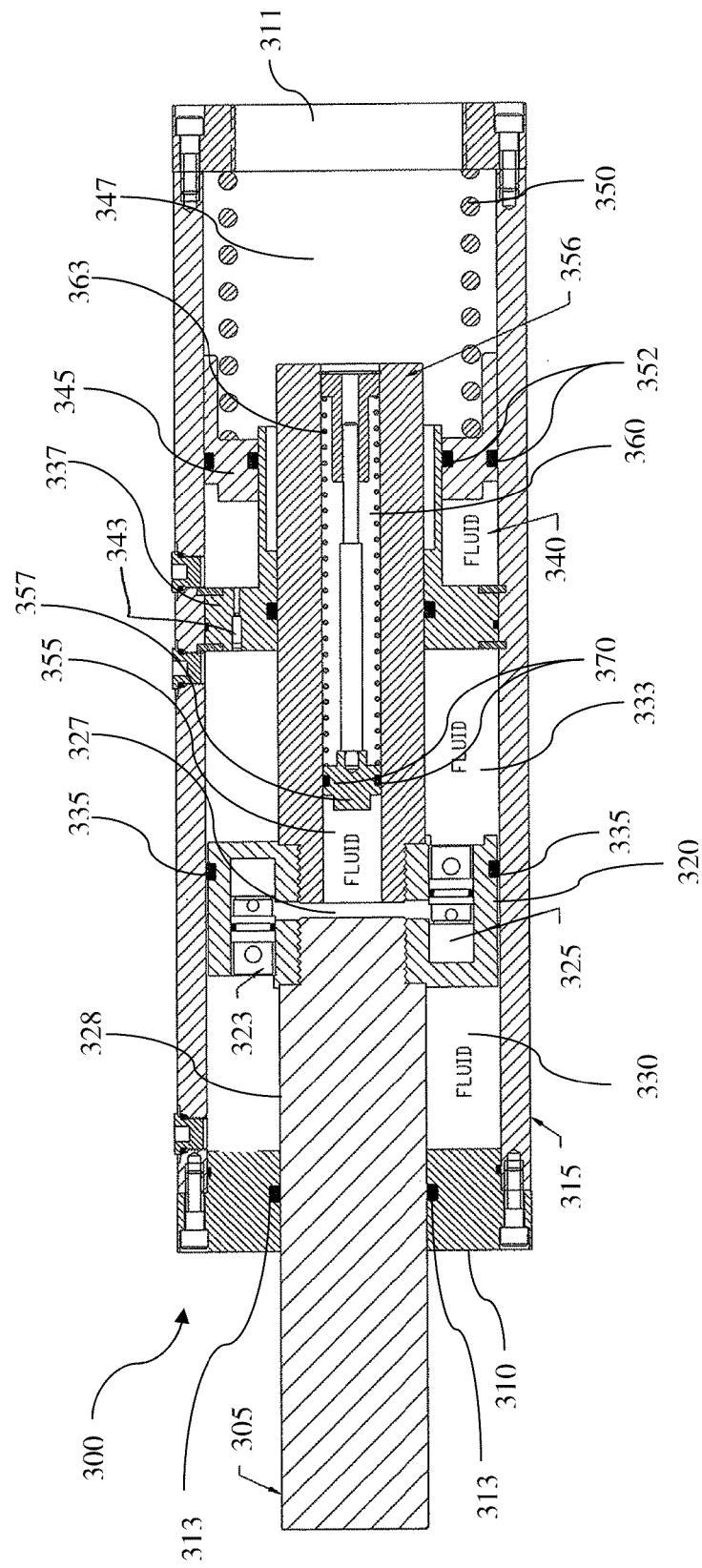
FIG. 3 is an embodiment of a snubber.

FIG. 3 depicts an embodiment of a snubber 300. Snubber 300 has a piston 380 that fits within a body 315. Piston rod 305 enters body 315 through open end 310. In certain embodiments, open end 310 has seals 313 surrounding piston rod 305 to prevent any fluid inside body 315 from leaking out. The exposed end of piston rod 305 may be coupled either to a fixed infrastructure (e.g. a wall or a floor) or to a moving object (e.g. a pipe). While closed end 311 of body 315 may be coupled to the other of the fixed infrastructure and the moving object. Snubber 300 may be able to bear any load, preferably snubber 300 is able to bear a load up to 300 klb, and more preferably, snubber 300 is able to bear a load of between 50 klb and 120 klb.

While any fluid can be used in snubber 300, preferably a fluid that is only slightly compressible is used. Such a fluid may be a silicon based fluid, such as dimethyl diphenyl polysiloxane, or dimethyl polysiloxane. Preferably the fluid has viscosity stability of up to 300 mRad, more preferably the fluid has viscosity stability of between 40 mRad and 200 mRad.

In certain embodiments, piston 380 contains a lockup valve 320. Lockup valve 320 consists of two valves 323 and 325 in fluid communication via a conduit 327. Valve 323 is in fluid communication with a first fluid chamber 330, while valve 325 is in fluid communication with a second fluid chamber 333. First fluid chamber 330 and second fluid chamber 333 are separated from each other by lockup valve 320. Lock up valve 320 is coupled to piston 360 and may have seals 335 to prevent fluid from leaking from first fluid chamber 330 to second fluid chamber 333, or vice versa.

In certain embodiments, second fluid chamber 333 has an end plate 337 at the opposite end of second fluid chamber 333 from lockup valve 320. End plate 337 is coupled to body 315 and allows piston rod 356 to pass through end plate 337. End plate 337 separates second fluid chamber 333 from main reservoir 340. Second fluid chamber 333 and main reservoir 340 are in fluid communication via fine orifice 343, which may be within end plate 337. Main reservoir 340 may be enclosed on the end opposite from end plate 337 by reservoir piston 345. Reservoir piston 345, along with body 315 and closed end 311, enclose spring cavity 347. Spring cavity 347 includes spring 350 that puts main reservoir 340 under pressure by applying a slight force on reservoir piston 345. Reservoir piston 345 may have seals 352 to prevent the fluid in main reservoir 340 from leaking into spring cavity 347.

A secondary reservoir 355 is located within the rear piston rod 356. Secondary reservoir 355 is in fluid communication with conduit 327 of lockup valve 320. Secondary reservoir 355 is contained by secondary piston 357. Secondary piston 357 separates secondary reservoir 355 from secondary spring cavity 360. Secondary spring cavity 360 contains secondary spring 363, which keeps the fluid in secondary reservoir 355 under a low pressure. Secondary piston 357 may include seals 370 to prevent the fluid in secondary reservoir 355 from leaking into secondary spring cavity 360.

During operating conditions of snubber 300, piston 325 is allowed to move smoothly within body 315. Operating conditions may include movement of pipes during thermal expansion or contraction, or weight change. As such, lockup valve 320 is in an unlocked position and fluid can move between first fluid chamber 330 and second fluid chamber 333 though lockup valve 320 as needed. Thus, constant pressure is maintained throughout snubber 300. In the case of thermal fluid expansion or contraction within first fluid chamber 330 and second fluid chamber 333, main reservoir 340 can absorb any excess fluid or provide additional fluid to maintain the fluid pressure within snubber 300.

However, during a predetermined set of conditions, such as seismic events, water hammer events, or valve blowoff, lockup valve 320 becomes locked and prevents fluid from traversing from one side of lockup valve 320 to the other, thus limiting movement of piston 380. Since the fluid used in snubber 300 is preferably slightly compressible, there will be some limited movement of piston 380. As piston 325 moves, the fluid in one of fluid chambers 330 and 333 will become compressed while a vacuum will be created in the other fluid chamber. In order to prevent degasification or vaporization of the fluid caused by a vacuum, the fluid in secondary reservoir 355 will be released to fill up the space caused by the vacuum. Since the fluid in secondary reservoir 355 is under pressure a drop in pressure from either first fluid chamber 330 or second fluid chamber 333 will cause the fluid in secondary reservoir 355 to flow toward the area of low pressure thus rebalancing the pressure within snubber 300.

EXAMPLE

Figure 4A:
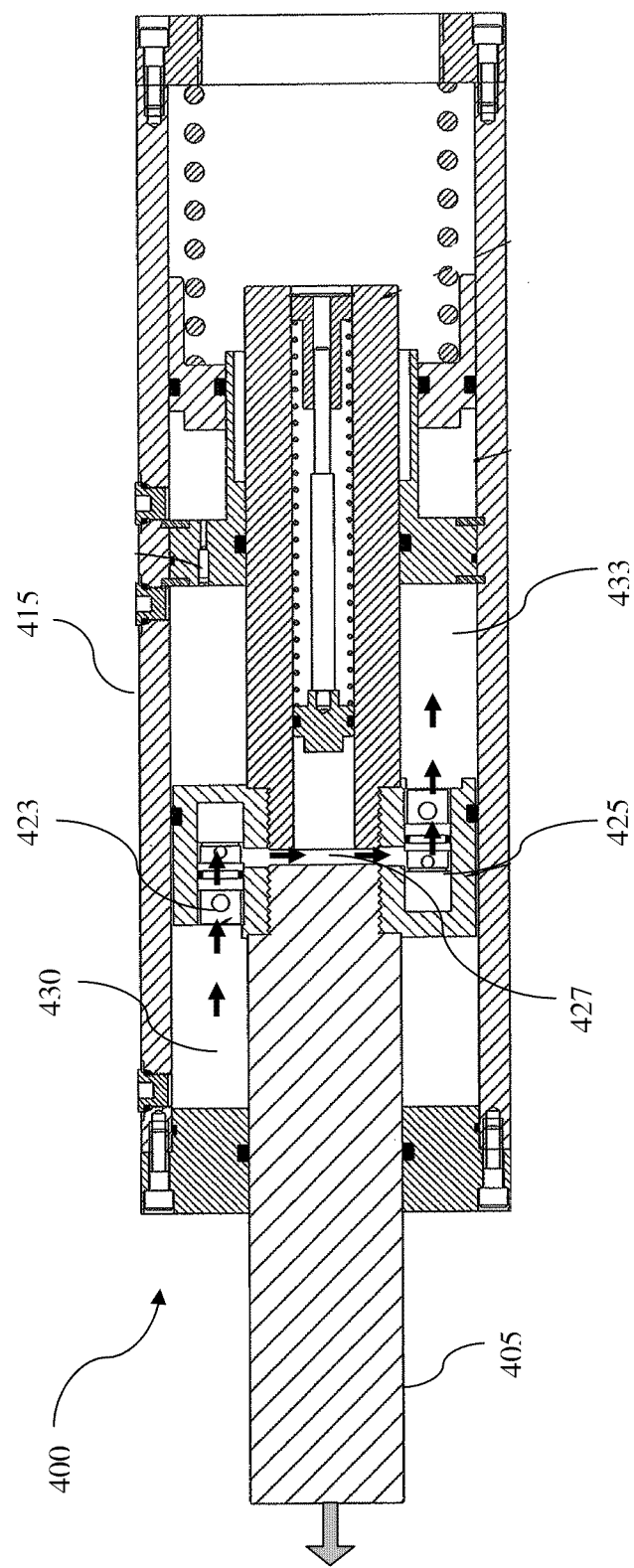
FIGS. 4a-d are examples of an embodiment of a snubber in use.

FIGS. 4a-d show a snubber 400 in several conditions. FIG. 4a shows snubber 400 under operating conditions where piston rod 405 is being pulled out of body 415, as shown by the gray arrow. Under such operating conditions, fluid in first fluid chamber 430 is drawn through first valve 423, into conduit 427, out of second valve 425, and into second fluid chamber 433. Under such conditions, neither first valve 423 nor second valve 425 are locked and the fluid in first fluid chamber 430 and second fluid chamber 433 can flow freely in the direction show by the black arrows.

Figure 4B:
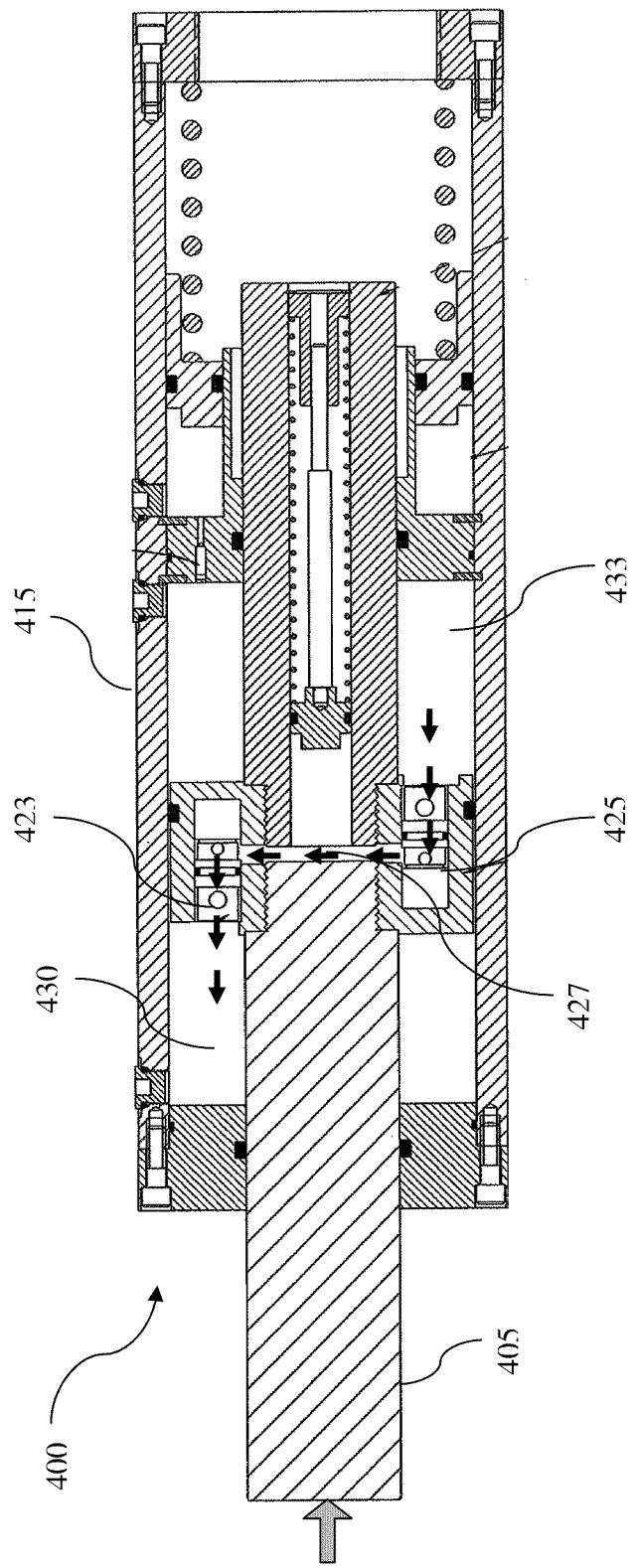

FIG. 4b shows snubber 400 under operating conditions where piston rod 405 is being pushed into body 415, as shown by the gray arrow. Under such operating conditions, fluid in second fluid chamber 433 is drawn through second valve 425, into conduit 427, out of first valve 423, and into first fluid chamber 430. Under such conditions, neither first valve 423 nor second valve 425 are locked and the fluid in first fluid chamber 430 and second fluid chamber 433 can flow freely in the direction show by the black arrows.

Figure 4C:
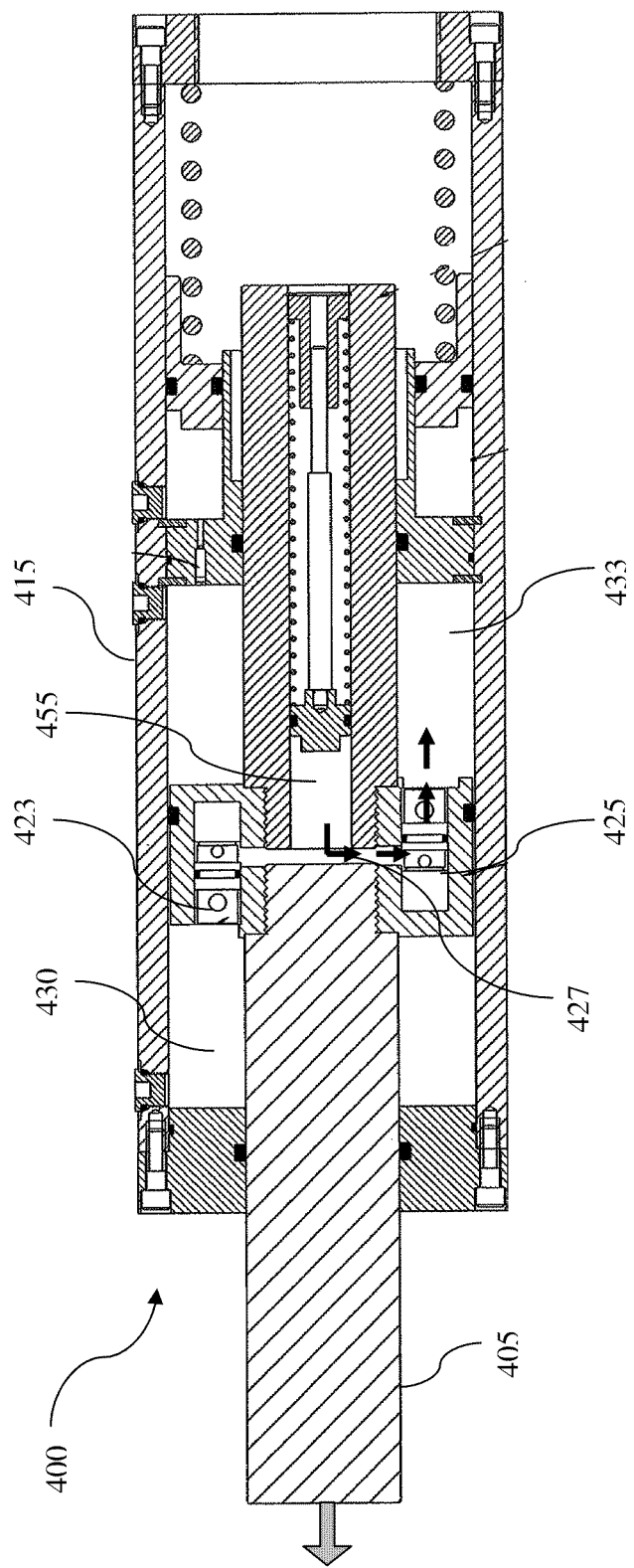

FIG. 4c shows snubber 400 under a predetermined set of conditions, wherein first valve 423 is locked and piston rod 405 is being pulled out of body 415, as shown by the gray arrow. Since first valve 423 is locked, fluid cannot flow from first fluid chamber 430 to second fluid chamber 433. Therefore, in order to prevent a vacuum from forming in second fluid chamber 433, fluid is drawn out of secondary reservoir 455 into conduit 427, out of second valve 425, and into second fluid chamber 433 as show by the black arrows.

Figure 4D:
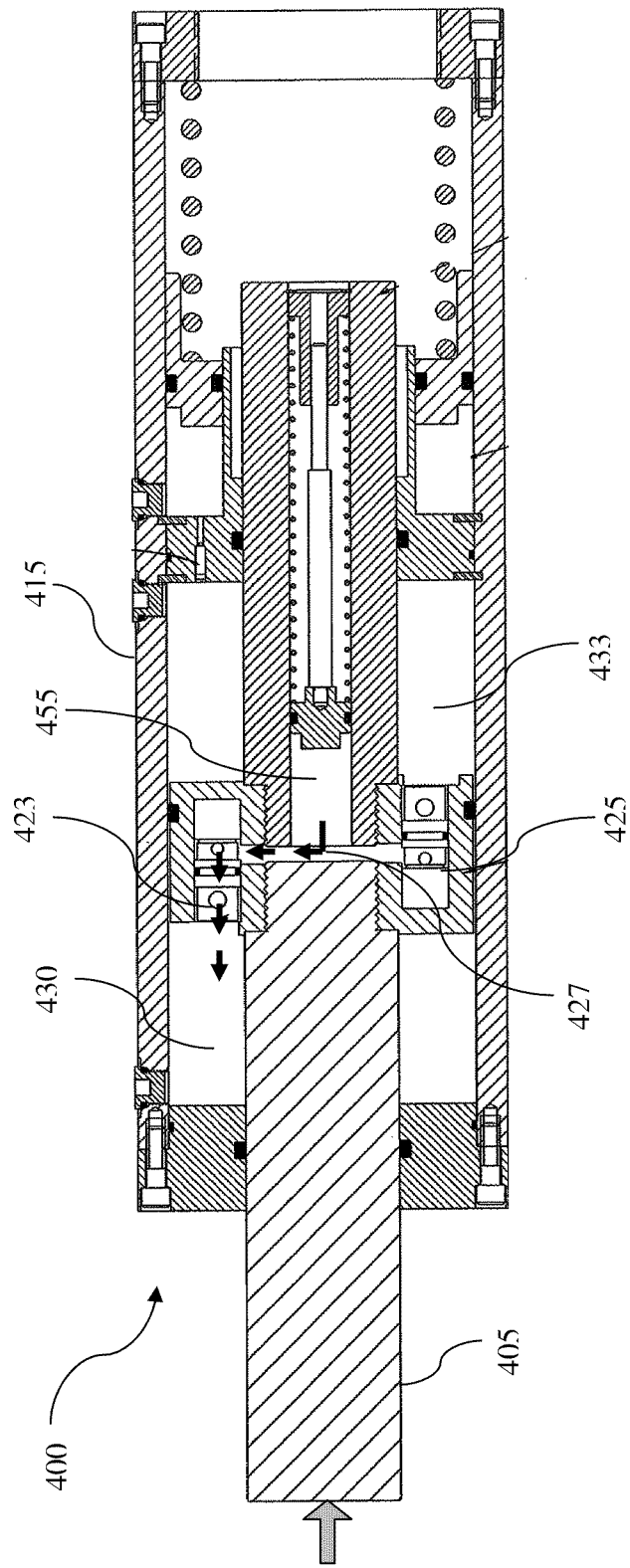

FIG. 4d shows snubber 400 under a predetermined set of conditions, wherein second valve 425 is locked and piston rod 405 is being pushed into body 415, as shown by the gray arrow. Since second valve 425 is locked, fluid cannot flow from second fluid chamber 433 to first fluid chamber 430. Therefore, in order to prevent a vacuum from forming in first fluid chamber 430, fluid is drawn out of secondary reservoir 455 into conduit 427, out of first valve 423 and into first fluid chamber 430 as show by the black arrows.

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A snubber, comprising:
   a body containing fluid;
   a piston, including a piston rod, adapted to slide within the fluid in the body;
   a lockup valve positioned outside of the piston rod wherein under operating conditions the lockup valve is unlocked enabling the piston to move freely, and wherein under a predetermined set of conditions the lockup valve is locked limiting the motion of the piston;
   a main reservoir defined by the body and containing fluid, and
   a second reservoir defined within the piston rod containing a reserve of fluid,
   wherein the lockup valve divides at least a portion of the body into a first chamber and a second chamber,
   wherein under the predetermined set of conditions the lockup valve prevents fluid flow between the two chambers, and
   wherein under the predetermined set of conditions, the lockup valve is lockable outside of the piston rod and enabled to remain locked when there is a difference in fluid pressure between the two chambers.

2. The snubber of claim 1, wherein the lockup valve is coupled to the piston.

3. The snubber of claim 1, wherein the lockup valve is comprised of at least two valves in fluid communication with each other via a conduit.

4. The snubber of claim 3, wherein a first valve lock is in fluid communication with the first chamber and a second valve lock is in fluid communication with the second chamber.

5. The snubber of claim 4, wherein as the piston moves within the body, fluid displaced by the piston is transferred between the first chamber and the second chamber via the lockup valve.

6. The snubber of claim 1, further comprising a first compression device within the body to keep the fluid in the main reservoir under pressure.

7. The snubber of claim 6, further comprising a second compression device coupled to the second reservoir to keep the fluid in the second reservoir under pressure.

8. The snubber of claim 1, wherein the main reservoir supplies fluid during the operating conditions and the second reservoir supplies fluid during the predetermined set of conditions.

9. The snubber of claim 1, wherein the fluid is silicon based.

10. The snubber of claim 9, wherein the fluid has viscosity stability of between 40 mRad and 200 mRad.

11. The snubber of claim 1, wherein the snubber is able to bear a load of between 50 klb and 120 klb.

12. The snubber of claim 1, wherein the predetermined set of conditions is a seismic event, valve closure, or water hammer event.

13. The snubber of claim 1, wherein the operating conditions are movement of a pipe due to thermal expansion or contraction.

14. A method for controlling the motion of an object, comprising the steps of:
    allowing the object to move freely during operating conditions with a snubber, the snubber including a body, a fluid contained in the body, a piston slidable in the body, the main reservoir defined by the body and containing fluid a lockup valve positioned between the body and the piston;
    limiting the movement of the object during a predetermined set of conditions with the snubber by preventing the fluid from flowing through the lockup valve; and
    preventing vacuums in the snubber during the predetermined set of conditions with fluid held in a second reservoir inside a piston rod of the snubber, wherein the predetermined set of conditions is at least one of a seismic event, a valve closure, and a water hammer event.

15. The method of claim 14, wherein the object is a pipe.

16. The method of claim 15, wherein the lockup valve is coupled to the piston, the lockup valve limiting movement during the predetermined set of conditions.

17. The method of claim 16, wherein the lockup valve is open during operation conditions and closed during the predetermined set of conditions.

18. The method of claim 14, wherein the predetermined set of conditions is a seismic event, valve closure, or water hammer event.

19. The method of claim 14, wherein the operating conditions are movement of a pipe due to thermal expansion or contraction.

20. The method of claim 14, further comprising the step maintaining the fluid within the snubber during operating conditions with fluid held in the main reservoir outside the piston.

21. The method of claim 14, further comprising the step of applying pressure to the fluid within the snubber.

22. The snubber of claim 1, wherein the second reservoir is configured to supply at least a portion of fluid from the reserve of fluid to the first chamber and the second chamber under a predetermined set of conditions such that the second reservoir supplies the at least a portion of fluid from the reserve of fluid alternatively to one of the first chamber and the second chamber, wherein the one of the chambers to which the at least a portion of fluid from the reserve of fluid is supplied is the chamber from which the piston moves away when the lockup valve is locked.

* * * * *